United States Patent [19]

Inoue

[11] Patent Number: 4,850,238
[45] Date of Patent: Jul. 25, 1989

[54] SHIFTLEVER MECHANISM FOR AN AUTOMATIC TRANSMISSION

[75] Inventor: Nobuaki Inoue, Fujisawa, Japan

[73] Assignee: Isuzu Motors Limited, Tokyo, Japan

[21] Appl. No.: 125,307

[22] Filed: Nov. 25, 1987

[30] Foreign Application Priority Data

Nov. 29, 1986 [JP] Japan .................................. 61-284619

[51] Int. Cl.⁴ ............................................. B60K 20/02
[52] U.S. Cl. ................................ 74/473 R; 200/61.88; 200/61.91; 74/501.6
[58] Field of Search ................. 74/335, 336 R, 473 R, 74/473 P, 473 SW, 475, 523; 116/28.1; 200/61.88, 61.91

[56] References Cited

U.S. PATENT DOCUMENTS

| | | | |
|---|---|---|---|
| 3,889,547 | 6/1975 | Sun et al. | 74/336 |
| 4,199,747 | 4/1980 | Miller et al. | 200/61.88 |
| 4,271,728 | 6/1981 | Wakamatsu | 74/473 P |
| 4,365,522 | 12/1982 | Kubota et al. | 74/475 |
| 4,513,276 | 4/1985 | Kubota et al. | 74/473 R |
| 4,646,585 | 3/1987 | Strohmeyer et al. | 74/473 R |

Primary Examiner—Leslie A. Braun
Assistant Examiner—Janice Chartoff
Attorney, Agent, or Firm—Dykema Gossett

[57] ABSTRACT

A shiftlever mechanism for an automatic transmission is equipped with a shiftlever which can be moved freely from the drive position in the direction of shifting and an overdrive switch which is turned on or off by the shiftlever as the shiftlever is shifted from the drive position, so that the driver is able to perform the shifting into overdrive easily and without diverting his eyes from the road.

7 Claims, 3 Drawing Sheets

SHIFTLEVER MECHANISM FOR AN AUTOMATIC TRANSMISSION

BACKGROUND OF THE INVENTION

1. Technical Field

The present invention generally relates to a shiftlever mechanism for an automatic transmission, and deals more particularly with a shiftlever mechanism in which a shift into overdrive can be performed by moving the shiftlever in the direction of shifting.

2. Background Art

The selection of overdrive has generally been performed by turning on or off an overdrive switch, which is located in the dashboard or near the shiftlever of the vehicle. However, this arrangement is not only troublesome for the driver, because he has to manipulate the overdrive switch and then confirm the result, but is unfavorable for safe driving of the vehicle, because in operating the switch and in confirming the result, the driver's eyes are necessarily diverted from the driving view.

To solve this problem, a shiftlever mechanism for an automatic transmission, shown in FIG. 7, has been proposed which is disclosed in Japanese Utility Model Laid Open No. 75120/83. In this proposal, the shiftlever a is divided into an upper part b and a lower part c so that the upper part b and the lower part c move in unison when shifting the shiftlever in the longitudinal direction of a vehicle, but when shifting into overdrive, the upper part b is tilted in the transverse direction with the lower part c as its fulcrum, by which motion an overdrive switch d of a rotary type, which is disposed in the direction of such transverse motion, is turned on or off.

Also, in order to permit selection of overdrive at every position of forward shifts, a plate f having a length that covers all the forward shift positions is provided to the moveable contact point e of the overdrive switch d.

One deficiency in this construction is that there can easily be cases where the shiftlever is unwittingly shifted into the overdrive position by tilting the shiftlever, thereby turning the overdrive switch on or off, in the process of shifting if the driver errs in controlling the force he applies to the shift lever.

Since misshifting in selecting overdrive is unfavorable for fuel economy and power output, a shiftlever mechanism for automatic transmission that enables unfailing selection of overdrive by moving the shiftlever in the direction of shifting would be desirable.

SUMMARY OF THE INVENTION

It is an object of this invention to provide a shiftlever mechanism that enables shifting into overdrive simply by operating a shiftlever.

Another object of this invention is to provide a shiftlever mechanism that requires the shiftlever to pass through the drive position before shifting into overdrive when a vehicle is running.

A further object of this invention is to provide a shiftlever mechanism that not only does not call for the driver's direct observation by his eyes, but also makes the shiftlever operation easy in shifting into overdrive.

Yet another object of this invention is to provide a shiftlever mechanism that does not allow shifting from overdrive position into another position, for example, into drive position, without operating the shiftlever.

The objects set forth above are achieved by a shiftlever mechanism for an automatic transmission, which includes a shiftlever moveable in the direction of shifting from a state in the drive position and an overdrive switch that is located on the rack of the movable shiftlever to be turned on or off by means of the shiftlever.

DESCRIPTION OF THE PREFERRED EMBODIMENTS

A preferred embodiment of the shiftlever mechanism for an automatic transmission according to this invention will now be described with reference to the attached drawings.

Figure 1:
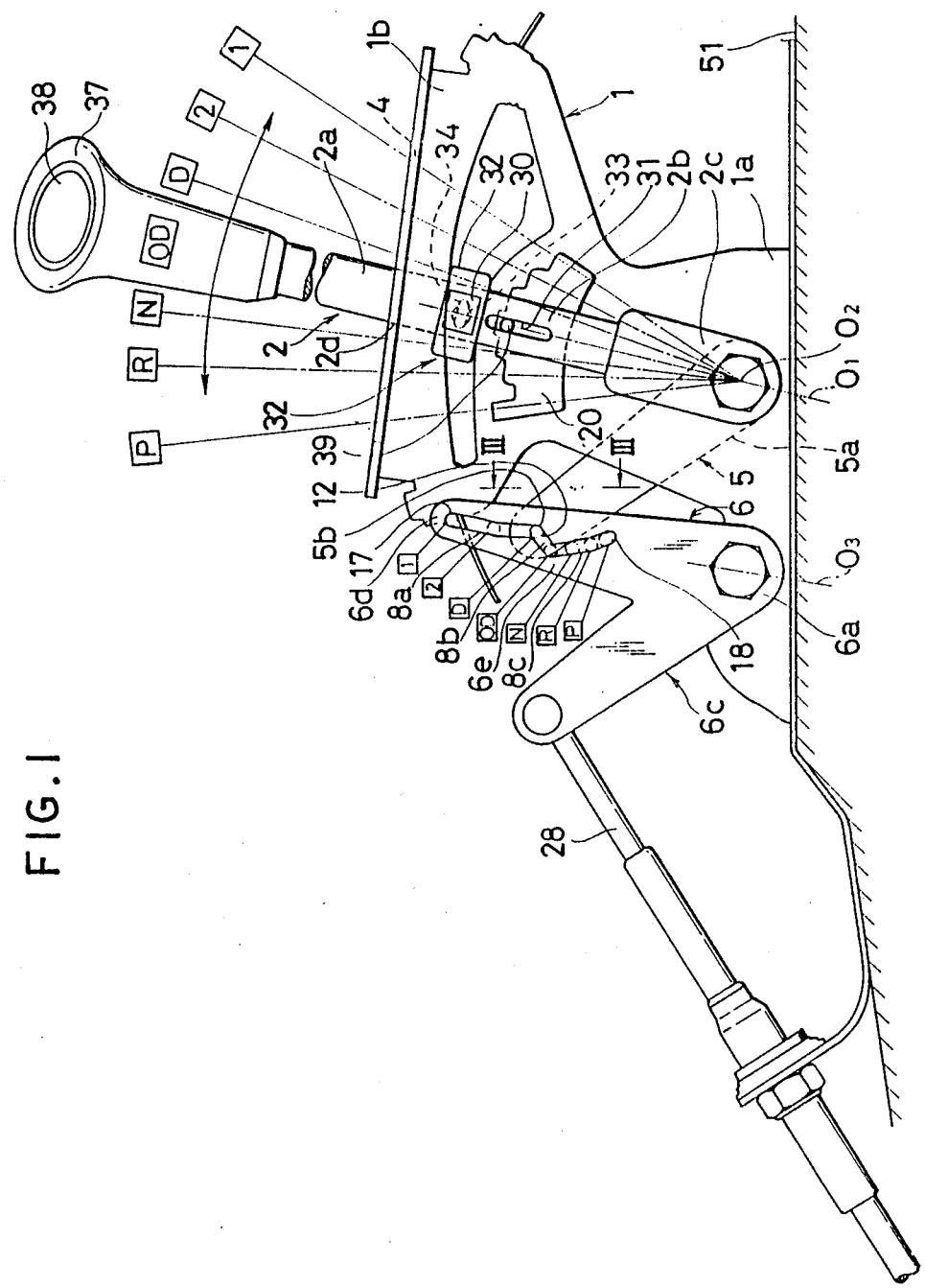
FIG. 1 is an elevation view of the shiftlever mechanism for an automatic transmission according to this invention, illustrating a preferred embodiment.

In FIG. 1, 1 stands for the bracket which is attached to the vehicle body floor (not shown), 2 for the shiftlever, and 28 for the transmission cable.

In the top part of the shiftlever bracket 1, there is formed a guide slot 4 in the direction of shifting so as to guide the shiftlever 2. The shiftlever 2 is so constructed that its upper stem 2a is slidably fitted in the guide slot 4 at 2d and that its lower stem 2c is pivotably supported at a floor-side portion 1a of the bracket 1. The shiftlever 2 can pivot in the longitudinal direction of the vehicle.

To the lowermost portion 2c of the shiftlever 2, which is on the side of the vehicle floor, there is firmly attached the lower end 5a of a lever member 5 extending in a direction intersecting the axial line 01 of the shiftlever 2. Also, as shown in FIG. 1, the lever member 5 has its upper end 5b positioned forwardly in the longitudinal direction of the vehicle and upward of the bracket 1.

The adjusting lever 6 is also pivotably engaged with the floor-side portion 1a of the bracket 1 at the lower part 6a thereof, located forwardly in the vehicle with respect to the rotational center 02 of the shiftlever 2. Also, the adjusting lever 6 has an arm 6c which is integrally formed therewith and extends from the lower part 6a forwardly and upwardly in the longitudinal direction of the vehicle. Furthermore, in the adjusting lever 6, there are formed: the first slot 8a of an arcuate shape in the upper portion 6d, which extends along the direction of the axial line 03; the second slot 8b of an arcuate shape, which is formed in the middle portion 6e, extending downwardly and forwardly with respect to the vehicle's longitudinal direction; and the third slot 8c of an arcuate shape, which is formed in the lower portion 6a side, extending downward and backwardly with respect to the vehicle's longitudinal direction. A lower end of the first slot is connected to an upper end of the second slot, and a lower end of the second slot is connected to an upper end of the third slot. Here, as shown in FIG. 2, angular portions 11 are formed at the junction 9 of the first slot 8a and the second slot 8b, and the junction 10 of the second slot 8b and the third slot 8c.

Within the slot comprising 8a, 8b and 8c, a pin 12 which is integrally engaged within the upper portion 5b of the lever member 5, is slidably fitted.

Figure 3:
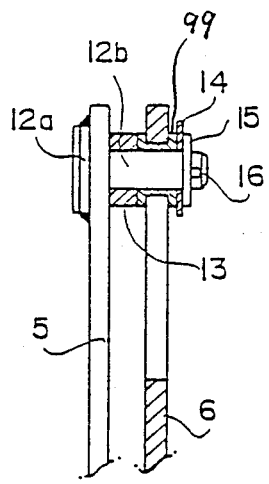
FIG. 3 is a cutaway view substantially taken along the III—III line of FIG. 1.

FIG. 3 illustrates the manner with which the lever member 5 and the adjusting lever 6 are mutually connected. Namely, the pin 12 includes a pin head portions 12a, which is attached to the lever member 5, at one end, and shaft portion 12b, which has a hole to receive a split pin at the other end, protruding through the lever member 5 and the adjusting lever 6. Around the shaft portion 12b there are provided from the lever member side in turn a collar 13, a sleeve 99 which is engaged within the slots of 8a-8c, a washer 14, and a C-ring 15. A split pin 16 is engaged within the hole to restrict the axial displacement of the pin 12.

Figure 2:
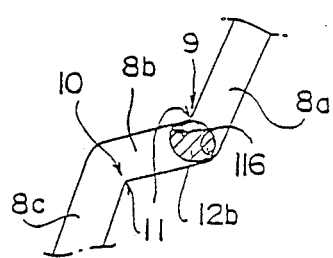
FIG. 2 is a partial enlarged view of FIG. 1.
Figure 4:
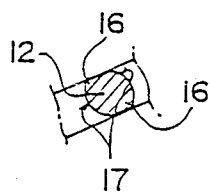
FIG. 4 is an enlarged view of a pin.

As shown in FIGS. 2 and 3, the cross-sectional form of that part of the shaft 12b of the pin 12 which is fitted to the slots 8a, 8b, or 8c is such that a squared part 116 is formed at both ends of a diameter, the rest of the cross-section remaining circular, so that when the pin 12 is moved to the angular junction 11, a slight resistance to shifting will be exerted on the shiftlever 2. Here, the radius of curvature of the second slot 8b is adapted to be the same as the pivoting radius of the lever member 5, relative to the mutual center 02.

Figure 5:
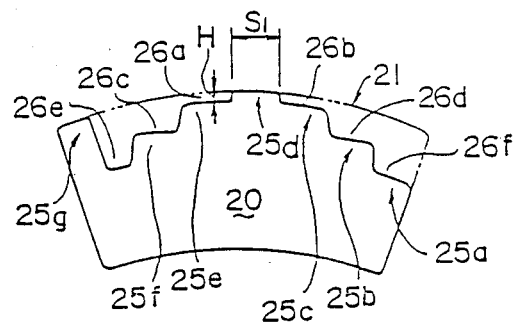
FIG. 5 is a drawing showing detents.

In the meantime, in that part of the bracket 1 which faces the middle part of the shiftlever 2, there is formed a fan-shaped opening 20 in the longitudinal direction of the vehicle, having its center at the shiftlever's pivot center 02. As shown in FIG. 5, the opening 20 defines detents 25a-25g defined by an imaginary line segment 21 and all detents are determined by this line segment 21 and teeth-like extensions 26a-26f protruding from the curve 21 toward the center 02. Geometric sizes of the extensions are different from each other. The detents referred to herein are, in turn from rear to front of the vehicle, the first detent 25a, the second detent 25b, the third detent 25c, the fourth detent 25d, the fifth detent 25e, the sixth detent 25f, and the seventh detent 25g. The manner of forming these detents is explained below.

As shown in FIGS. 1 and 5, first, an interval S1 of an appropriate length is provided on the line segment 21 at approximately the center thereof; then, at either side of the interval S1, two extensions 26a and 26b, the former at the front side of the vehicle and the latter at the rear side, are provided with approximately the same heights and width. Thus, the fourth detent 25d is defined by the interval S1, and two extensions 26a and 26b.

Next to the two extensions 26a and 26b, there are provided another two extensions 26c (third extension) and 26d (fourth extension) at the vehicle's front and rear sides, respectively, both extensions having approximately the same geometric size which are respectively larger than the extensions 26a and 26b; by doing so, at either side of the fourth detent 25d are defined the fifth detent 25e at the vehicle's front side and the third detent 25c at the rear. The width of the third detent 25c is taken to be longer than that of the fifth detent 25e.

Likewise, next to the third extension 26c is provided a fifth extension 26e, and next to the fourth extension 26d sixth extension 26f. These fifth and sixth extensions 26e and 26f have larger heights than 26c and 26d; by doing so, the sixth detent 25f is defined forward of the fifth detent 25e and the second detent 25b rearward of 25c.

Finally, the first detent 25a is defined by the sixth extension 26f at its end, on one hand, and the seventh detent 25g is defined by the fifth extension 26e and the line segment 21.

Here, the pivot center 02 side edges or protruding ends of the extensions 26a-f are each made into an arc having its center at 02.

The detents thus formed create a teeth-like line, and the first detent 25a corresponds to the position 1 (namely, the low gear position), the second detent 25b to the position 2 (namely, the second gear position), the third detent 25c to the position D (namely, the drive position), the fourth detent 25d to the position OD (namely, the overdrive position), the fifth detent 25e to the position N (namely, the neutral position), the sixth detent 25f to the position R (namely, the reverse position), and the seventh detent 25g to the position P (namely, the parking position).

Now, referring back to FIG. 1, in a portion 2b of the shiftlever 2 which faces the opening 20, there is formed a pin guide slot 31 in the direction of its axial line $O_1$, and in this pin guide slot 31, there is slidably fitted a lock pin 39, which is exerted radially outward with respect to the center 02, and moves slidingly along the teeth-like line. Moreover, the lock pin 39 is constructed so that it can be pushed downward by means of the push button 38 which is provided in the knob 37 of the upper leg 2a of the shiftlever 2. Furthermore, the depth H of the fourth detent 25d is selected so as to allow the lock pin 39 to overcome without the aid of push button 38 but to make the driver feel some resistance when he manipulates the shiftlever 2.

The peripheral interval S1 of the fourth detent 25d is selected so as to correspond to the distance the pin 12 travels in the second slot 8b from the junction 9 of the first slot 8a and the second slot 8b to the junction 10 of the second slot 8b and the third slot 8c. Similarly, the peripheral interval from the first detent 25a through the third detent 25c is determined so as to correspond to the distance the pin 12 travels in the first slot 8a from the upper end 17 thereof to the junction 9 of the first slot 8a and the second slot 8b. Likewise, the peripheral interval from the fifth detent 25e through the seventh detent 25g is determined so as to correspond to the distance the pin 12 travels in the third slot 8c from the junction 10 of the second slot 8b and the third slot 8c to the lower end 18 of the third slot 8c.

The mission cable 28 is designed so as to move a push-pull cable disposed therein (not shown) progressively into position 1→position 2→position D→position N→position R→position P as the adjusting lever 6 is tilted forwardly in the vehicle's longitudinal direction, so that the push-pull cable moves the shifting into the desired positions.

It is to be understood in the foregoing description that insofar as the pin 12 is in the second slot 8b of the lever member 5, the adjusting lever 6 does not undergo the tilting motion with the pin 39 of the shiftlever 2 remaining in the position OD, namely, in the fourth detent 25d. This means that for the shiftlever 2, this interval that the second slot provides functions to provide slack, whereby to maintain the driving position.

In order to achieve one of the important features of this invention, namely performing the shifting of the automatic transmission into OD position by tilting the shiftlever 2 in the vehicle's longitudinal direction, an overdrive switch 30 is disposed so as to be turned on when the pin 39 is positioned at the fourth detent 25d, as will be described in more detail below.

Figure 6A:
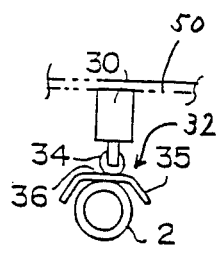
FIGS. 6(A) and (B) are drawings showing the manner of attaching an overdrive switch to a cam plate.

As shown in FIG. 1 and in the partial detailed drawings in FIGS. 6(A) and (B), at a place on the shiftlever 2 beyond the upper end of the pin guide groove 31 which is formed in the shiftlever 2, there is provided a cam plate 32 in the diametrical direction of and integrally attached to the shiftlever 2. Furthermore, both ends 35 of the cam plate 32 are similarly bent to an appropriate angle toward the shiftlever 2.

Figure 6B:
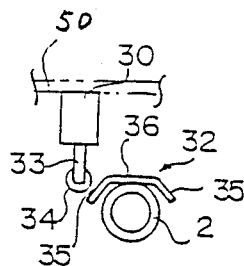
Figure 7:
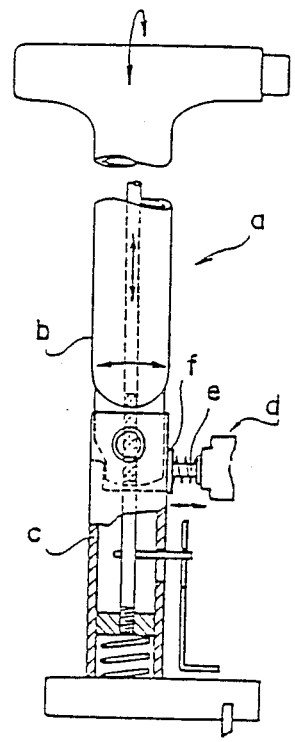
FIG. 7 is a schematic view showing a conventional shiftlever mechanism for an automatic transmission.

In this preferred embodiment, a switch which is equipped with a rod 33, and a roller 34 at the tip is adopted for the overdrive switch 30. The manner of disposing this overdrive switch 30 is such that, when the roller 34 is on the plateau 36, the switch 30 is turned on, as shown in FIG. 6(A); otherwise, it is turned off, as shown in FIG. 6(B). Here, the overdrive switch 30 is attached either to the bracket 1 in such a place as not to interfere with the shifting of the shiftlever 2 with an appropriate means, such as by means of attaching metal parts, or to the console box 50 that contains the bracket 1.

Furthermore, provision of an OD indicator in the console box 50 of the shiftlever 2 or in the dashboard so as to facilitate the confirming of OD shifting by coupling this indicator to the output of the overdrive switch 30 is a natural extension of this invention. Also, it is quite possible to apply the construction described above to an automatic transmission having no overdrive function by removing the overdrive switch 30.

What is claimed is:

1. A shiftlever mechanism for an automatic transmission comprising:
    a shiftlever;
    means defining a shiftlever track possessing, in order, a parking position (P), a reverse position (R), a neutral position (N), an overdrive position (OD), a drive position (D), a second position (2) and a low position (L);
    an automatic transmission;
    a cable connecting the shiftlever with the automatic transmission so as to change the gear ratio of the transmission as the shiftlever is placed in each of said positions except said OD position;
    means interposed in the cable for disconnecting the shiftlever from the transmission when the shiftlever is placed in the overdrive position thereof; and
    an overdrive switch actuated by the shiftlever when the shiftlever is in said OD position thereof.

2. A shiftlever mechanism for an automatic transmission, comprising:
    a shiftlever shiftable in a direction along a shift lever motion track from a driving position; and,
    an overdrive switch provided on the shiftlever motion track of said shiftlever so as to be turned on or off by means of said shiftlever upon shifting of said shiftlever along said track;
    said shiftlever being pivotably supported at the lower part of a bracket by means of a rotating shaft, said bracket being secured to a stationary part of the vehicle;
    said shiftlever having a lever member at its lower end, said lever member including a connecting part connected to the free end of an adjusting lever by which the shifting positions of said automatic transmission are selected;
    said adjusting lever having a guide path formed so as to guide said connecting part of said lever member and to guide said adjusting lever as it is tilted in the direction of shifting as said connecting part is so guided;
    said guide path having a slack portion formed therein, said slack portion allowing only said lever member to tilt when said shiftlever is shifted from the drive position into the overdrive position.

3. A shiftlever mechanism for an automatic transmission according to claim 2, wherein:
    said guide path comprises a plurality of arcuate slots, each of said slots being connected to the next slot in an undulating arrangement along the axial direction of said adjusting lever; and
    the free end of said lever member is connected to said slots by means of a pin slidably received within said slots.

4. A shiftlever mechanism for an automatic transmission according to claim 2, wherein:
    said shiftlever includes a pin guide groove and a lock pin, said pin guide groove being defined by a slot extending in the axial direction of said shiftlever, and said lock pin extending in a direction perpendicular to the axis of said shiftlever and being moveable within said pin guide groove; and
    said bracket includes a plurality of detents disposed in the tilting direction of said shiftlever, said detents being arranged so as to keep the axial position of said lock pin within said pin guide groove in the direction of the axis of said shiftlever, thereby to maintain the position of the thusly tilted shiftlever.

5. A shiftlever mechanism for an automatic transmission comprising:
    a bracket secured to a stationary part of the vehicle;
    a shiftlever pivotably supported at the lower part of said bracket by means of a rotating shaft, so that the shiftlever is shiftable in a direction along a shiftlever motion tract from a driving position to an overdrive position;
    a lever member on the lower end of said shiftlever, said lever member including a connecting part connected to the free end of an adjusting lever by which the shifting positions of said automatic transmission are selected, said adjusting lever possessing a guide path formed so as to guide said connecting part of said lever member and to guide said adjusting lever as it is tilted in the direction of shifting as said connecting part is guided, said guide path including a slack portion formed therein, said slack portion allowing only said lever member to tilt when said shiftlever is shifted from the drive position thereof into the overdrive position; and
    an overdrive switch provided on the shiftlever motion track of said shift lever and arranged to be turned on or off by means of said shiftlever upon shifting of said shiftlever along said track.

6. A shiftlever mechanism for an automatic transmission according to claim 5, wherein:
    said guide path comprises a plurality of arcuate slots, each of said slots being connected to an adjacent one of said slots in an undulating arrangement along the axial direction of said adjusting lever, and
    the free end of said lever member is connected to said slots by means of a pin slidably received within said slots.

7. A shiftlever mechanism for an automatic transmission according to claim 5, wherein:
    said shiftlever includes a pin guide groove and a lock pin, said pin guide groove being defined by a slot extending in the axial direction of said shiftlever, and said lock pin extending in a direction perpendicular to the axis of said shiftlever and being movable within said pin guide groove, and said bracket includes a plurality of detents disposed in the direction of tilt of said shiftlever, said detents being arranged so as to keep the axial position of said lock pin within said pin guide groove in the direction of the axis of said shiftlever, thereby to maintain the shiftlever in a tilted position thereof.

* * * * *